United States Patent
Sawada et al.

(10) Patent No.: US 10,192,136 B2
(45) Date of Patent: Jan. 29, 2019

(54) IMAGE PROCESSING APPARATUS AND IMAGE PROCESSING METHOD

(71) Applicant: TOSHIBA TEC KABUSHIKI KAISHA, Tokyo (JP)

(72) Inventors: Takayuki Sawada, Numazu Shizuoka (JP); Yuishi Takeno, Numazu Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 120 days.

(21) Appl. No.: 15/298,862

(22) Filed: Oct. 20, 2016

(65) Prior Publication Data

US 2018/0114322 A1   Apr. 26, 2018

(51) Int. Cl.
- *G06K 9/32*   (2006.01)
- *G06K 9/46*   (2006.01)
- *G06T 7/00*   (2017.01)

(52) U.S. Cl.
CPC .......... *G06K 9/4671* (2013.01); *G06T 7/0081* (2013.01)

(58) Field of Classification Search
CPC .................................................. G06T 7/0081
USPC ........................................................ 382/103
See application file for complete search history.

(56) References Cited

U.S. PATENT DOCUMENTS

| | | | | |
|---|---|---|---|---|
| 2009/0194593 A1* | 8/2009 | Kurihara | ............... | G07G 1/0054 235/462.41 |
| 2014/0023242 A1* | 1/2014 | Sugasawa | .......... | G06K 9/00624 382/110 |
| 2016/0086149 A1* | 3/2016 | Yuyama | ............... | G06Q 20/208 705/23 |

FOREIGN PATENT DOCUMENTS

JP   2014-235530   12/2014

\* cited by examiner

*Primary Examiner* — Raj Chakraborty
(74) *Attorney, Agent, or Firm* — Patterson & Sheridan, LLP

(57) ABSTRACT

An image processing apparatus and an image processing method notify a user of an object region from which an object cannot be recognized. The image processing apparatus includes an interface and a processor. The interface receives an input image. The processor extracts a first target object region from the input image and reads first identification information from the first target object region. If the first identification information fails to be read, the processor outputs an output image which includes the first target region and information representing read failure of the first target region.

13 Claims, 7 Drawing Sheets

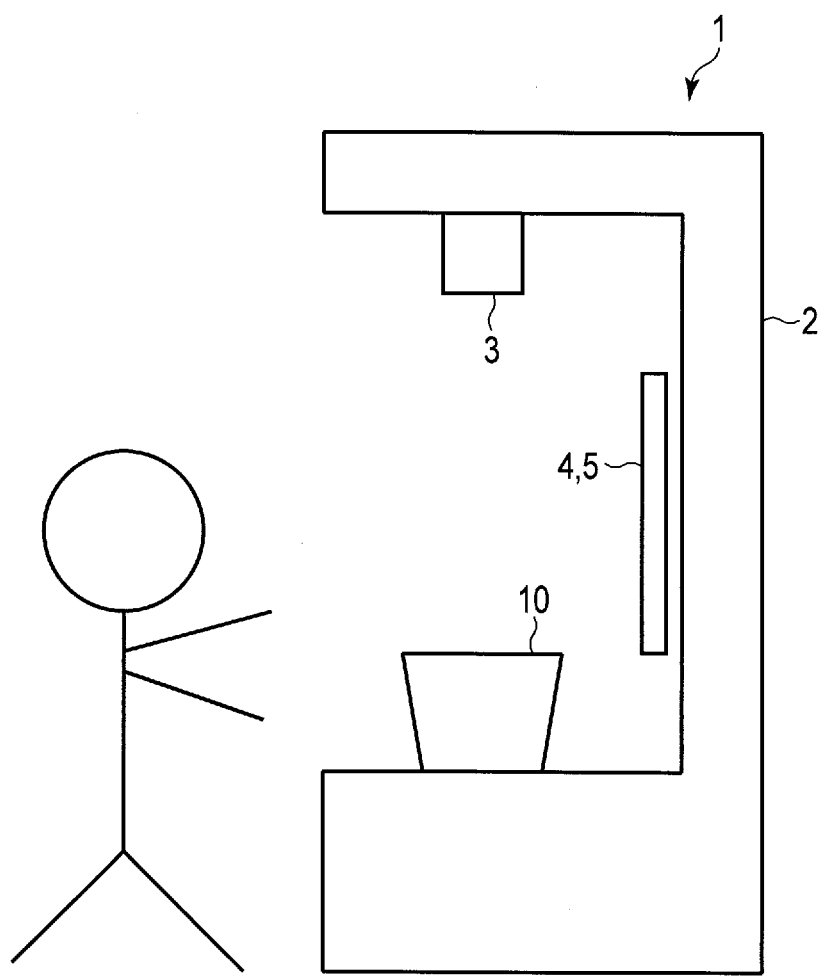
F I G. 1

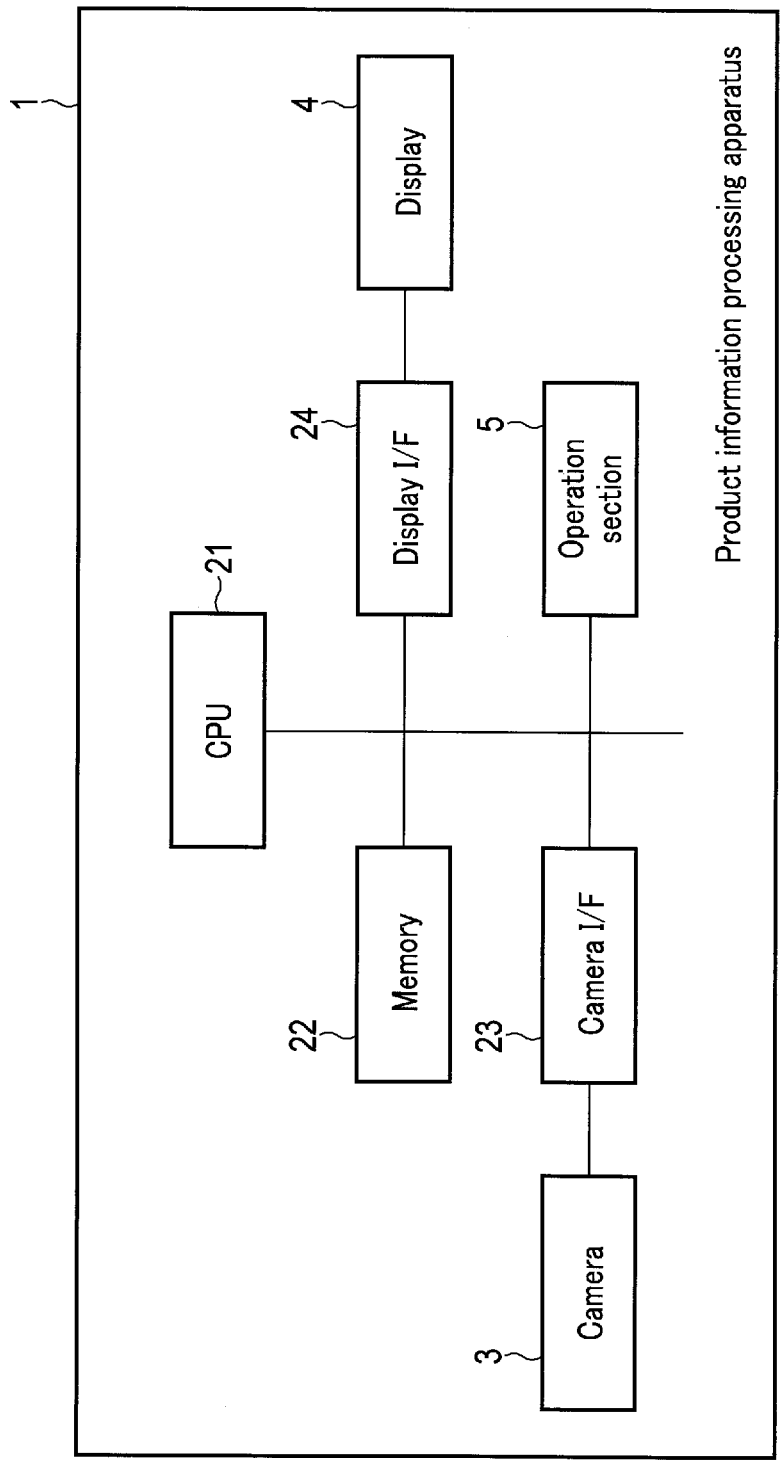
F I G. 2

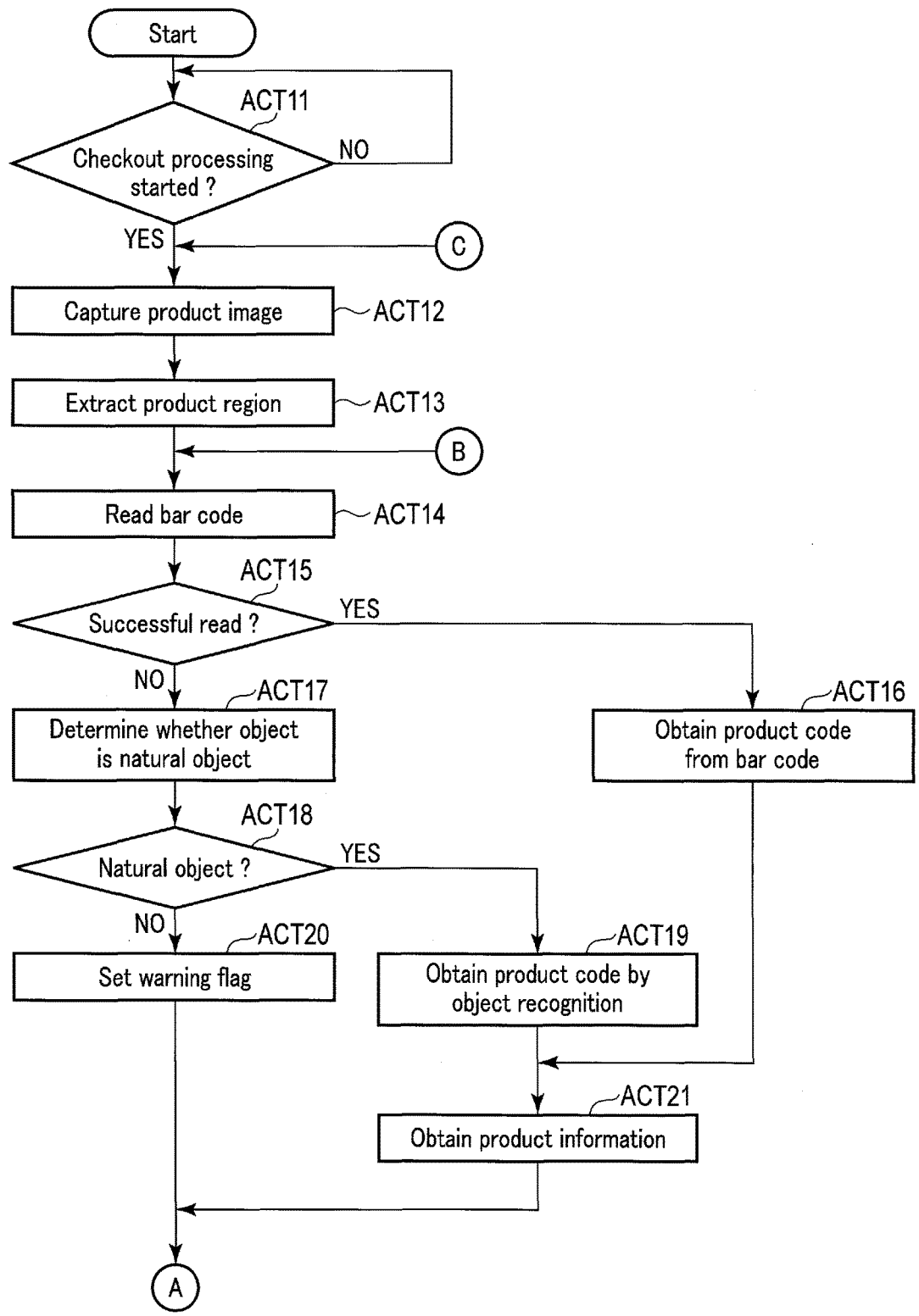
F I G. 5

IMAGE PROCESSING APPARATUS AND IMAGE PROCESSING METHOD

FIELD

Exemplary embodiments described herein relate to an image processing apparatus and an image processing method.

BACKGROUND

A known image processing has a function of recognizing commercial products based on an image captured by a camera. The image processing apparatus determines product regions where the commercial products are present by using an image, and recognizes the commercial products by reading bar codes from the product regions.

If products cannot be recognized from the product regions, the known image processing apparatus cannot notify a user of product regions for which the products cannot be recognized.

SUMMARY

Technical Problem

To solve the problem, an image processing apparatus and an image processing method are provided that can notify a user of an object region for which an object cannot be recognized.

Solution to Problem

An image processing apparatus of an embodiment is provided with an interface and a processor. The interface receives an input image. The processor extracts a first target object region from the input image and reads first identification information from the first target object region. If the first identification information cannot be read, the processor outputs an output image including the first target region and information representing a read failure of the first target region.

BRIEF DESCRIPTION OF THE DRAWINGS

FIG. 1 is a diagram schematically showing a configuration example of a product information processing apparatus of the first embodiment.

FIG. 2 is a block diagram showing the configuration example of the product information processing apparatus of the first embodiment.

FIG. 5 is a flowchart illustrating an operation example of the product information processing apparatus of the first embodiment.

DETAILED DESCRIPTION

Figure 3:
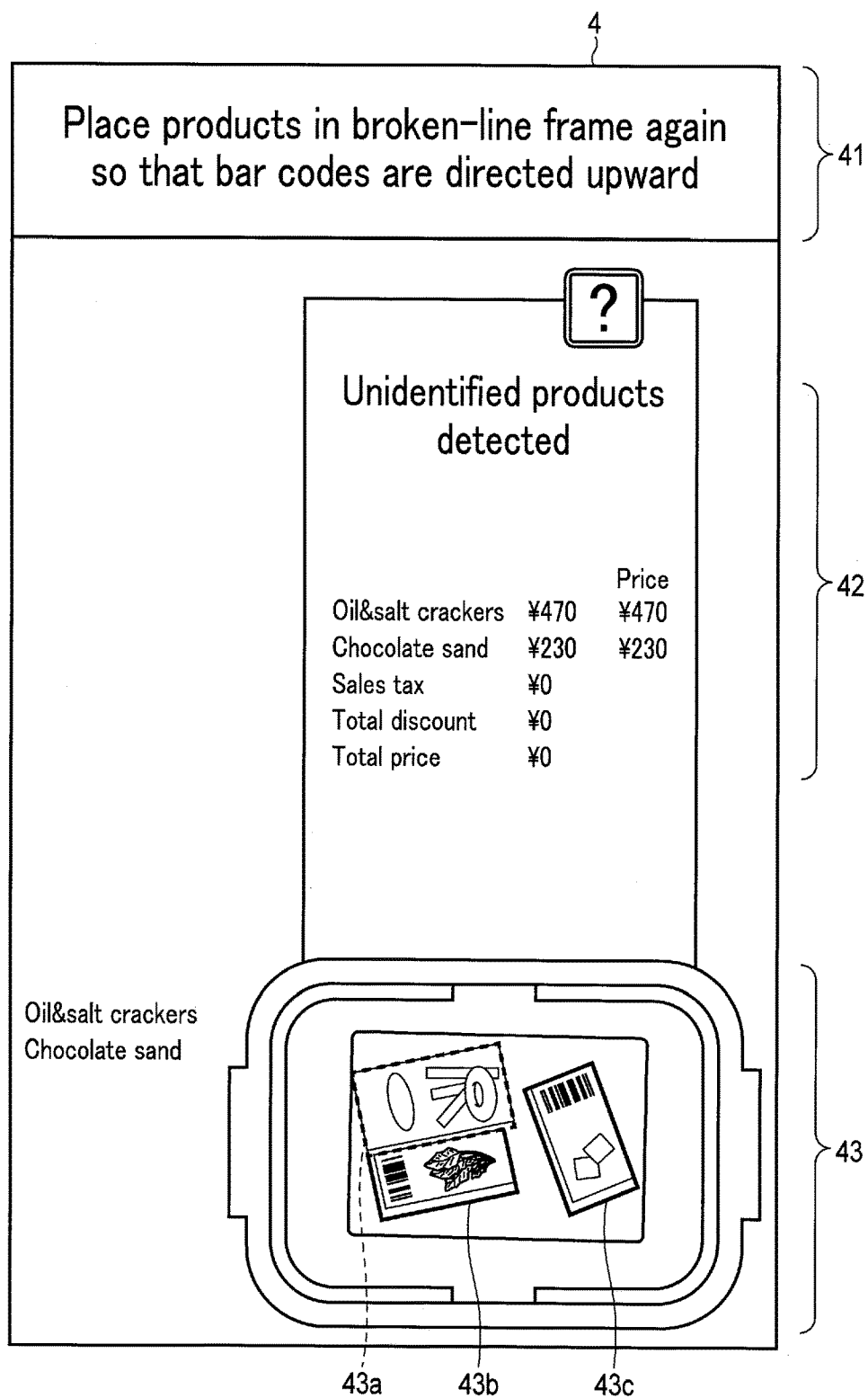
FIG. 3 shows an example of what the product information processing apparatus of the first embodiment displays.

In general, an image processing apparatus and an image processing method notify a user of an object region from which an object cannot be recognized. The image processing apparatus includes an interface and a processor. The interface receives an input image. The processor extracts a first target object region from the input image and reads first identification information from the first target object region. If the first identification information fails to be read, the processor outputs an output image which includes the first target region and information representing read failure of the first target region.

Hereinafter, embodiments will be described with reference to the accompanying drawings.

First Embodiment

First, a product information processing apparatus (image processing apparatus) of the first embodiment will be described.

FIG. 1 is a diagram schematically showing a configuration example of the product information processing apparatus 1 of the first embodiment.

The product information processing apparatus 1 checks out the commercial products in a shopping basket 10. The product information processing apparatus 1 is set at a store where products are sold. For example, the product information processing apparatus 1 checks out the products in the shopping basket 10 when the shopping basket 10 is placed on a predetermined position or when a predetermined operation is accepted. The product information processing apparatus 1 may be used as a self-checkout cash register with which a shopper checks out products. Alternatively, the product information processing apparatus 1 may be used as an ordinary type of checkout cash register with which a cashier checks out products.

The product information processing apparatus 1 recognizes products based on product (object) identifying patterns (identification information). The products in the shopping basket 10 have product identifying patterns. For example, the product identifying patterns include bar codes, QR codes (registered trade name), characters, numerals or marks. It is assumed here that the product identifying patterns are bar codes.

As shown in FIG. 1, the product information processing apparatus 1 is provided with a casing 2, a camera 3, a display 4, an operation section 5, etc.

The casing 2 is a frame that determines the shape of the product information processing apparatus 1. The casing 2 is formed so that a shopping bag can be placed thereon. In the example shown in FIG. 1, the casing 2 has a U shape and a shopping bag can be placed inside.

The camera 3 captures an image of the products in the shopping bag 10. In the example shown in FIG. 1, the camera 3 captures an image of the basket 10 from above. The camera 3 may be set so that it can capture an image of the basket 10 from an obliquely upward position. The position and direction of the camera 3 are not limited to a specific position and direction.

The product information processing apparatus 1 may include a plurality of cameras 3. In this case, the cameras 3 may be arranged at different positions and at different angles to capture an image of the products in the baskets 10.

The camera 3 is, for example, a CCD camera. For example, the camera 3 may be configured to capture an image of invisible rays. The configuration of the camera 3 is not limited to any specific configuration.

The display 4 is a device which shows an image output from a CPU 21, which will be mentioned later. For example, the display 4 is a liquid crystal monitor.

The user of the product information processing apparatus enters various operation instructions from an operation section 5. The operation section 5 transmits data on the operation instructions entered by the user to the CPU 21. The operation section 5 includes, for example, a keyboard, a numeric keypad and a touch panel. The operation section 5 may be configured to receive inputs entered as gestures of the user.

It is assumed here that the operation section 5 is a touch panel integrally formed with the display 4.

The camera 3, the display 4 or the operation section 5 may be integrally formed with the casing 2.

The product information processing apparatus 1 may be provided with a lamp for illuminating the products in the basket 10.

A configuration example of the product information processing apparatus 1 will be described.

FIG. 2 is a block diagram showing the configuration example of the product information processing apparatus 1.

As shown in FIG. 2, the product information processing apparatus 1 is provided with a camera 3, a display 4, an operation section 5, a CPU 21, a memory 22, a camera interface 23, a display interface 24, etc. These structural elements are connected to each other through a data bus. The product information processing apparatus 1 may be provided with structural elements in addition to the structural elements shown in FIG. 2, as needed. Conversely, a specific structural element may be omitted.

The camera 3, the display 4 and the operation section 5 are as described above.

The CPU 21 has a function of controlling the entire product information processing apparatus 1. The CPU 21 may be provided with an internal cache and various interfaces. The CPU 21 realizes various kinds of processing by executing a program stored in an internal memory or memory 22 in advance. The CPU 21 is, for example, a processor.

Part of the various functions realized by the CPU 21 executing the program may be realized by a hardware circuit. In this case, the CPU 21 controls the function executed by the hardware circuit.

The memory 22 includes a volatile memory, a nonvolatile memory, or the like. The memory 22 stores a control program, control data, etc. recorded in advance. The memory 22 temporarily stores data etc. in process by the CPU 21. For example, the memory 22 stores various application programs which are executed based on instructions from the CPU 21. The memory 22 may also store data necessary for executing an application program, an execution result of the application program, etc.

The camera interface 23 is an interface that enables the CPU 21 to communicate with the camera 3. For example, the CPU 21 transmits, through the camera interface 23, a signal for causing the camera 3 to capture an image. The CPU 21 may also transmits, through the camera interface 23, a camera parameter for image capturing.

The camera interface 23 obtains an image captured by the camera 3. The camera interface 23 transmits the obtained image to the CPU 21. The CPU 21 obtains an image captured by the camera 3 from the camera interface 23.

The display interface 24 is an interface that enables the CPU 21 to communicate with the display 4. For example, the CPU 21 transmits a predetermined image to the display 4 through the display interface 24.

A description will now be given of functions realized by the CPU 21.

The CPU 21 has a function of obtaining a product image (an input image), including a bar code representing a product in the basket 10. The product image includes a bar code for specifying a product. For example, the CPU 21 causes the camera 3 to capture an image of the products in the basket 10, thereby obtaining a product image. The CPU 21 may set an image capturing parameter in the camera 3 to capture the product image.

The CPU 21 may receive a product image from an external device.

The CPU 21 has a function of extracting a product region (a target object region), including an image of a product, from the product image.

For example, the CPU 21 specifies the product region based on the difference between the colors of the products and the background color (e.g., the color of the inside of the basket 10). For example, the CPU 21 obtains the background color beforehand and extracts regions having colors different from the background color from the product image as product regions.

The CPU 21 may extract a product region based on the height which the product region has in the product image. For example, the CPU 21 causes a distance sensor or the like to measure a distance between a predetermined position and the image of each product image. The CPU 21 extracts a region having a level higher than the bottom of the basket 10 as a product region.

The method in which the CPU 21 extracts product regions is not limited to a specific method.

The CPU 21 has a function of reading a bar code from a product region.

For example, the CPU 21 extracts a bar code region including an image of a bar code from the product region. For example, the CPU 21 executes a raster scan using pattern matching for the product image, thereby extracting a bar code region.

The CPU 21 recognizes a bar code included in the bar code region. For example, the CPU 21 decodes the bar code in the bar code region. By decoding the bar code, the CPU 21 obtains a product code for identifying a product.

The method in which the CPU 21 reads bar codes is not limited to a specific method.

Where a character sequence is provided for a product as a pattern, the CPU 21 may execute OCR processing for the product image, thereby reading the character sequence.

The CPU 21 has a function of determining whether a product for which a bar code fails to be read is a natural object.

The natural object is a product in the natural state. The natural object is a product not processed by a human. For example, the natural object is a product to which a bar code is not attached. The natural object is, for example, a vegetable or a fruit.

The CPU 21 determines whether a product included in the product image is a natural object, by performing image recognition. If the CPU 21 determines that the product included in the product region is not a natural object, the CPU 21 sets a warning flag for that product region, representing a failure to recognize a product.

The CPU 21 has a function of specifying a product from a product region including a natural object.

For example, the CPU 21 specifies a product in a product region, by performing object recognition. For example, the CPU 21 obtains a product code representing a product in a product region, by performing object recognition.

The CPU 21 has a function of acquiring product information, based on a product code obtained by decoding a bar code or a product code obtained by performing object recognition.

For example, the memory 22 stores a product table in which product codes and product information are associated with each other. By referring to the product table, the CPU 21 obtains product information corresponding to a product code. The product table may be stored in a higher-level apparatus of the product information processing apparatus 1. In this case, the CPU 21 obtains the product information corresponding to a product code from the higher-level apparatus by way of a communication unit.

The product information is information regarding a product. For example, the product information includes a product name and a price. The configuration of the product information is not limited to a specific configuration.

The CPU has a function of displaying a product region for which a warning flag is set, as a product region for which product recognition fails.

For example, the CPU displays the product region for which the warning flag is set on a predetermined area of the display 4, and that product region is displayed as a product region for which product recognition fails. For example, the CPU 21 displays a product image. In the product image, the CPU 21 displays a broken-line frame (information indicating a read failure) with respect to a product region for which product recognition fails. By displaying the broken-line frame with respect to the product region for which product recognition fails, the CPU 21 indicates that the product recognition fails with respect to the product region.

The CPU 21 has a function of displaying a product region for which product recognition is performed successfully.

For example, the CPU displays the product region for which product recognition is successfully performed on a predetermined area of the display 4. For example, the CPU 21 displays a product image. In the product image, the CPU 21 displays a solid-line frame (information indicating a read success) with respect to the product region for which product recognition is successfully performed. By displaying the solid-line frame with respect to the product region for which product recognition is successfully performed, the CPU 21 indicates that the product recognition is performed with respect to the product region.

The CPU 21 may present product information on a product which is recognized successfully. For example, the CPU 21 displays a product name and a price as the product information. Where a plurality of products are recognized successfully, the CPU 21 may display the total price of the products.

A description will now be given of an example of what the display 4 displays where the CPU 21 fails to perform product recognition with respect to part of product regions.

FIG. 3 shows an example of what the display 4 shows where the CPU 21 fails to perform product recognition with respect to part of the product regions.

As shown in FIG. 3, the CPU 21 provides the display 4 with display areas 41 to 43.

Display area 41 shows a message to the effect that the products of product regions for which the product recognition fails should be placed again such that the bar codes of the products are directed upward. For example, display area 41 shows a message to the effect that the products indicated by the broken lines should be placed again.

Display area 42 (a product information image) shows product information on products which are recognized successfully. For example, display area 42 shows names and prices of products that are recognized successfully. Display area 42 may show a message to the effect that there are products that are not recognized successfully.

Display area 43 (an output image) shows products successfully recognized and products not successfully recognized in distinction from each other. For example, display area 43 shows product images. In the product images shown in display area 43, the products that are successfully recognized are indicated with solid-line frames. In the product images shown in display area 43, the products that are not successfully recognized are indicated with broken-line frames.

As shown in FIG. 3, display area 43 shows frames 43*a* to 43*c*.

Frame 43*a* is a broken-line frame. Therefore, frame 43*a* indicates that product recognition fails in the product region within frame 43*a*.

Frames 43*b* and 43*c* are solid-line frames. Therefore, frames 43*b* and 43*c* indicate that product recognition is successfully performed in the product regions within frames 43*b* and 43*c*.

What the CPU 21 shows on the display 4 is not limited to a specific configuration.

A description will now be given of an example of what the display 4 displays where the CPU 21 successfully performs product recognition with respect to all product regions.

Figure 4:
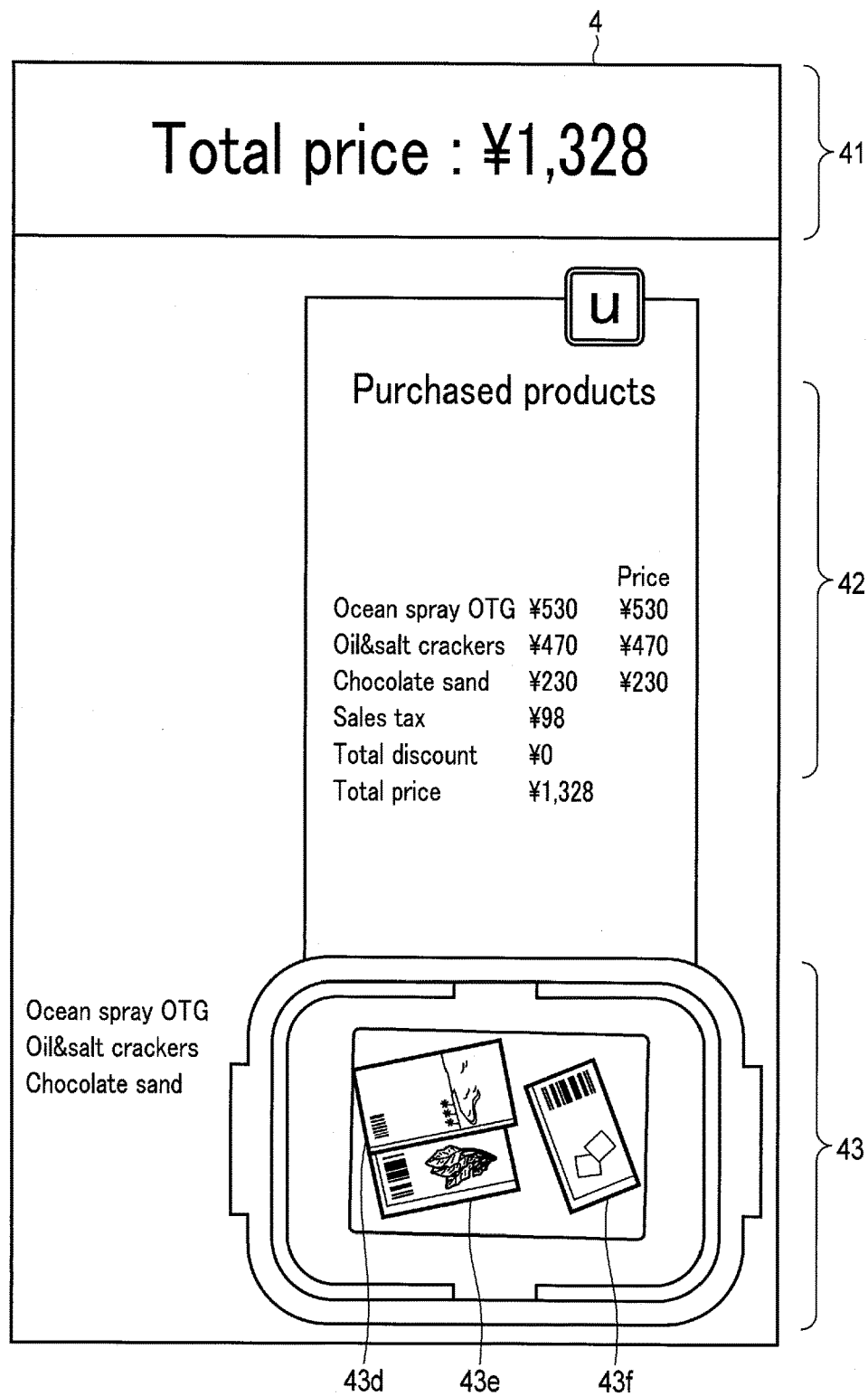
FIG. 4 shows an example of what the product information processing apparatus of the first embodiment displays.

FIG. 4 shows an example of what the display 4 shows where the CPU 21 successfully performs product recognition with respect to all product regions.

As shown in FIG. 4, the CPU 21 provides the display 4 with display areas 41 to 43.

Display area 41 shows the total price of products.

Display area 42 shows names and prices of products. Display area 42 may show a sales tax and a total price. Display area 42 may also show a message to the effect that products are successfully recognized in all product regions.

Display area 43 shows product regions in which products are successfully recognized. For example, display area 43 shows product images. In the product images shown in display area 43, the products that are successfully recognized are indicated with solid-line frames.

As shown in FIG. 4, display area 43 shows frames 43*d* to 43*f*.

Frames 43*d* to 43*f* are solid-line frames. Therefore, frames 43*d* and 43*f* indicate that product recognition is successfully performed in the product regions within frames 43*d* to 43*f*.

What the CPU 21 shows on the display 4 is not limited to a specific configuration.

The CPU 21 has a function of checking out products where the products are successfully recognized in the respective product regions.

For example, the CPU 21 obtains the credit information on the purchaser who purchases the products. For example, the CPU 21 may accept the credit information which is entered by the purchaser from the operation section 5. The CPU 21 may obtain an image of the purchaser captured by a camera and obtain credit information corresponding to the image.

Based on the obtained credit information, the CPU 21 checks out the products. For example, the CPU 21 transmits the credit information and the total price of products to a credit server.

A description will now be given of an example of an operation the CPU 21 performs.

Figure 6:
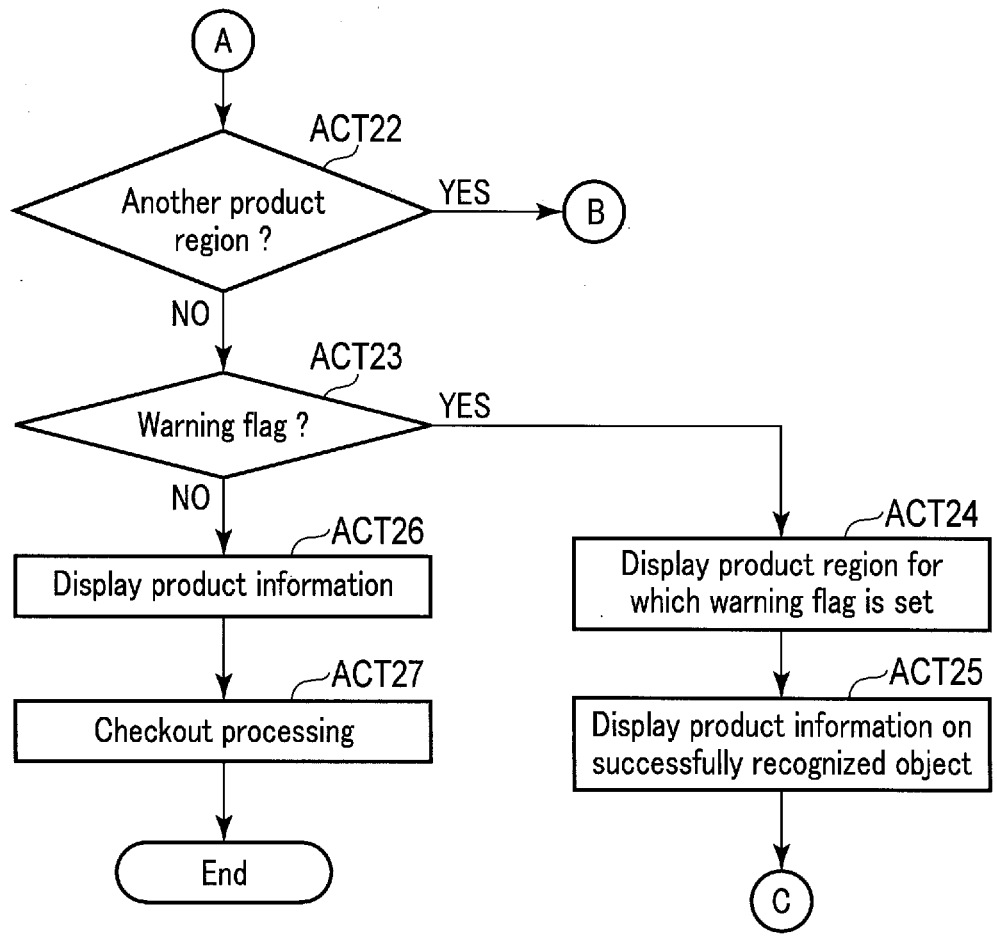
FIG. 6 is a flowchart illustrating the operation example of the product information processing apparatus of the first embodiment.

FIGS. 5 and 6 are flowcharts illustrating the example of the operation the CPU 21 performs.

First of all, the CPU 21 determines whether the checkout processing should be started (ACT11). For example, the CPU 21 determines that the checkout processing should be started in response to detection of a shopping basket 10 set on a predetermined position. The CPU 21 may determine that the checkout processing should be started upon reception of a predetermined operation performed at the operation section 5.

If the CPU 21 determines that the checkout processing should not be started (NO in ACT11), the CPU 21 returns to ACT11.

If the CPU 21 determines that the checkout processing should be started (YES in ACT11), the CPU 21 causes the camera 3 to capture a product image (ACT12).

After acquiring the product image, the CPU 21 extracts a product region from the captured product image (ACT13). After extracting the product region, the CPU 21 reads a bar code in one product region (ACT14).

If the bar code is successfully read (YES in ACT15), the CPU 21 obtains a product code corresponding to the decoded bar code (ACT16).

If the bar code fails to be read (NO in ACT15), the CPU 21 determines whether the product shown in the product region is a natural object (ACT17). If the product shown in the product region is a natural object (YES in ACT18), the CPU 21 performs object recognition in the product region to obtain a product code (ACT19).

If the product shown in the product region is not a natural object (NO in ACT18), the CPU 21 sets a warning flag for the product region (ACT20).

Where a product code is obtained by decoding a bar code (ACT16) or where the product code is obtained by performing object recognition in the product region (ACT19), CPU 21 obtains product information based on the product code (ACT21).

Where a warning flag is set for the product region (ACT20) or where product information is obtained based on the product code (ACT21), the CPU 21 determines whether or not another product region is present (ACT22).

If the CPU 21 determines that another product region is present (YES in ACT22), the CPU 21 executes ACT14 and the subsequent acts with respect to that another product region.

If the CPU 21 determines that another product region is not present (NO in ACT22), the CPU 21 determines whether there is a product region for which a warning flag is set (ACT23). If the CPU 21 determines that the product region for which a warning flag is set is present (YES in ACT24), the CPU 21 displays that product region on the display 4 as a product region for which product recognition fails (ACT24).

After displaying the product region for which the warning flag is set, the CPU 21 displays the product region, product name and price of the successfully-recognized product on the display 4 (ACT25). After displaying the product region, product name and price of the successfully-recognized product on the display 4, the CPU 21 returns to ACT12. The CPU 21 may return to ACT12 upon reception of a predetermined operation performed at the operation section 5.

If the CPU 21 determines that the product region for which a warning flag is set is not present (NO in ACT23), the CPU 21 displays each product region, the product information on each product and the total price on the display 4 (ACT26).

After displaying each product region, the product information on each product and the total price on the display 4, the CPU 21 performs checkout processing on the total price (ACT27). The CPU 21 may perform the checkout processing on the total price upon reception of a predetermined operation performed at the operation section 5.

After the checkout processing on the total price, the CPU 21 ends the operation.

The CPU 21 may perform ACT24 and ACT25 in parallel. Alternatively, the CPU 21 may first perform ACT25 and then perform ACT24.

The product information processing apparatus configured as above can detect a product region for which product recognition fails and causes the display to show that product region. As a result, the product information processing apparatus can show to the user a product region for which product recognition fails.

In addition, if a bar code fails to be read from a product region, the product information processing apparatus determines whether the product of that product region is a natural object. If the product is a natural object, the product information processing apparatus performs object recognition to identify the product. Therefore, even if the bar code fails to be read, the product information processing apparatus can recognize the product. As a result, the product information processing apparatus can effectively recognize products.

Second Embodiment

A product information processing apparatus according to a second embodiment will be described.

The product information processing apparatus 1 of the second embodiment differs from the product information processing apparatus 1 of the first embodiment in that the former does not determine whether the product in a product region is a natural object. Accordingly, the components having the same configurations as the first embodiment will be denoted by the same reference symbols, and a detailed description of such components will be omitted.

A description will now be given of an example of an operation the CPU 21 performs.

Figure 7:
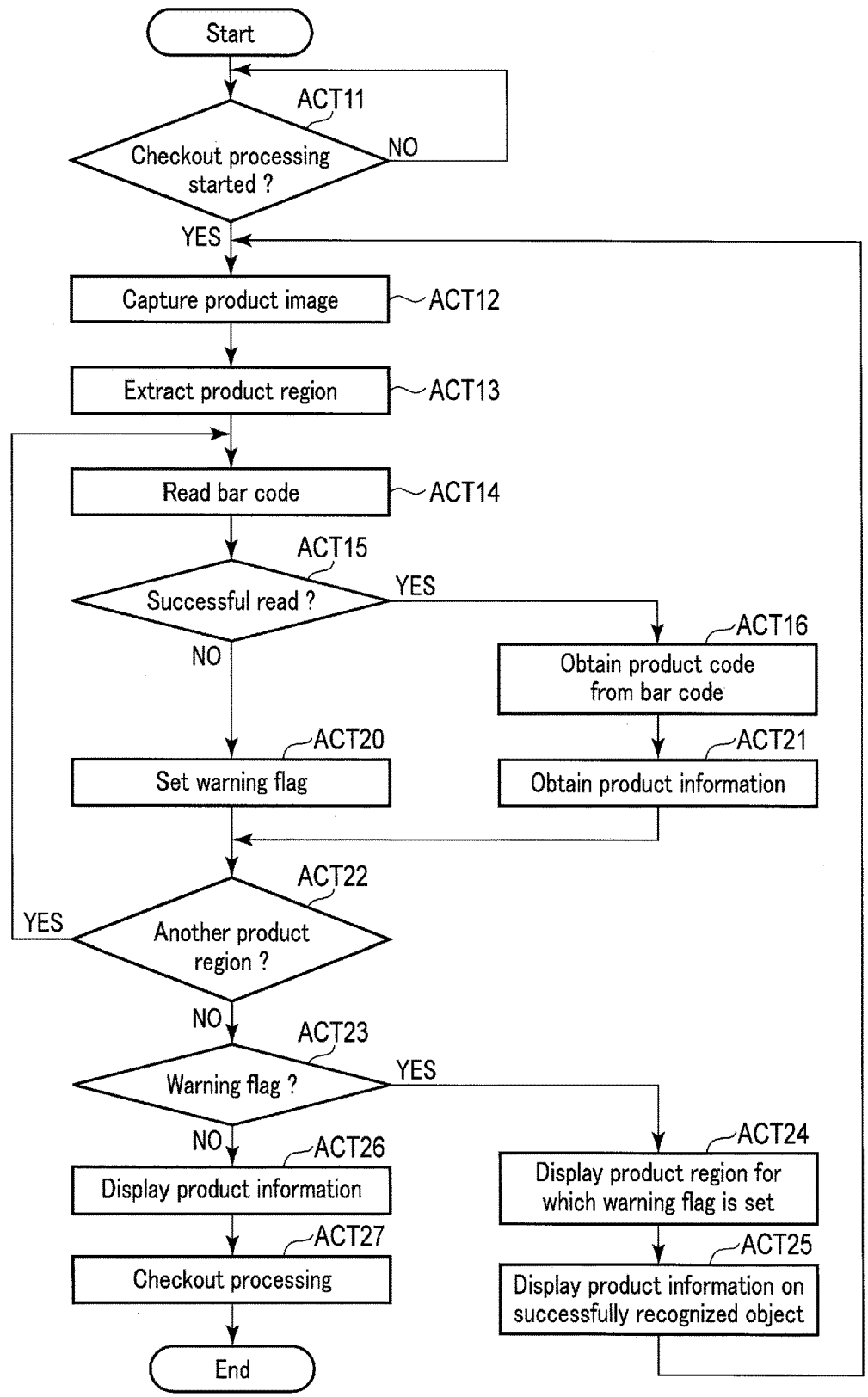
FIG. 7 is a flowchart illustrating an operation example of a product information processing apparatus of the second embodiment.

FIG. 7 is a flowchart illustrating the example of the operation the CPU 21 performs.

In FIG. 7, the operations similar to those of FIGS. 5 and 6 will be denoted by the same reference symbols, and a detailed description of such operations will be omitted.

If a bar code fails to be read from a product region (NO in ACT15), the CPU 21 sets a warning flag for the product region (ACT20).

Where a product code is obtained by decoding a bar code (ACT16), the CPU 21 obtains product information based on the product code (ACT21).

The product information processing apparatus configured as above can detect a product region for which product recognition fails and causes the display to show that product region. As a result, the product information processing apparatus can show to the user a product region for which product recognition fails.

The product information processing apparatus does not perform object recognition if a bar code fails to be read. As a result, the product information processing apparatus enables a short processing time and a low processing cost.

While certain embodiments have been described, these embodiments have been presented by way of example only, and are not intended to limit the scope. Indeed, the novel embodiments described herein may be embodied in a variety of other forms; furthermore, various omissions, substitutions and changes in the form of the embodiments described herein may be made without departing from the spirit. The accompanying claims and their equivalents are intended to cover such forms or modifications as would fall within the scope and spirit.

The invention claimed is:

1. A checkout device comprising:
a camera which captures an input image of a product;
a display device; and
a processor programmed to:
identify a first target object region in the input image,
determine whether first identification information can be extracted from the first target object region,
in response to the first identification information not being able to be extracted:
output an output image including the first target object region and information indicating that identification information cannot be extracted from the first target object region, and
control the display device to display the output image on the input image,
in response to the first identification information being able to be extracted, register a product corresponding to the first identification information, and
perform a settlement processing for each product registered in a transaction.

2. The checkout device according to claim 1, wherein the processor is further programmed to:
identify a second target object region from the input image,
determine whether second identification information can be extracted from the second target object region, and
if the second identification information can be extracted from the second target object region;
control the display device to display the output image further including the second target object region and information indicating that identification information can be extracted from the second target object region, and
register a product corresponding to the second identification information.

3. The checkout device according to claim 1, wherein the processor is further programmed to
determine whether a target object in the first target object region is a natural object if the first identification information cannot be extracted from the first target object region,
identify the target object in the first target object region by object recognition if the target object is determined to be the natural object, and
control the display device to display the output image if the target object is not determined to be the natural object.

4. The checkout device according to claim 3, wherein the natural object is a vegetable or a fruit.

5. The checkout device according to claim 3, wherein the target object is a commercial product.

6. The checkout device according to claim 5, wherein the processor is further programmed to:
obtain product information on the target object based on the first identification information if the first identification information can be extracted from the first target object region, and
control the display device to display a product information image including at least part of the product information.

7. The checkout device according to claim 6, wherein the product information includes a price of the target object, and the processor is programmed to perform the settlement processing with respect to the target object based on the product information.

8. The checkout device according to claim 7, wherein the processor is programmed to not perform the settlement processing with respect to the target object if identification information cannot be extracted from at least one target object region.

9. A checkout method comprising:
receiving an input image of a product;
identifying a first target object region from the input image;
determining whether first identification information can be extracted from the first target object region;
in response to the first identification information cannot not being able to be extracted:
outputting an output image including the first target object region and
information indicating that identification information cannot be extracted from the first target object region, and
controlling a display device to display the output image on the input image;
in response to the first identification information being able to be extracted, registering a product corresponding to the first identification information; and
performing a settlement processing for each product registered in connection with one transaction.

10. The checkout method according to claim 9, further comprising:
identifying a second target object region from the input image;
determining whether second identification information can be extracted from the second target object region; and
if the second identification information can be extracted from the second target object region:
controlling the display device to display the output image further including the second target object region and information indicating that identification information can be extracted from the second target object region, and
registering a product corresponding to the second identification information.

11. The checkout method according to claim 9, further comprising:
determining whether a target object in the first target object region is a natural object if the first identification information cannot be extracted from the first target object region;
identifying the target object in the first target object region by object recognition if the target object is determined to be the natural object; and
controlling the display device to display the output image if the target object is not determined to be the natural object.

12. The checkout method according to claim 11, wherein the target object is a commercial product, the method further comprising:
obtaining product information on the target object based on the first identification information if the first identification information can be extracted from the first target object region; and
control the display device to display a product information image including at least part of the product information.

13. The checkout method according to claim 12, wherein:
the product information includes a price of the target object, and
the settlement processing with respect to the target object is performed based on the product information.

* * * * *